United States Patent
Verma et al.

(10) Patent No.: US 9,538,545 B2
(45) Date of Patent: Jan. 3, 2017

(54) MAPPING DATA TRAFFIC THROUGHOUT PROTOCOL LAYERS BASED ON PRIORITY INFORMATION

(71) Applicant: QUALCOMM Incorporated, San Diego, CA (US)

(72) Inventors: Lochan Verma, San Diego, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/532,298

(22) Filed: Nov. 4, 2014

(65) Prior Publication Data

US 2016/0128079 A1 May 5, 2016

(51) Int. Cl.
*H04W 72/10* (2009.01)
*H04L 12/863* (2013.01)
*H04L 12/801* (2013.01)
*H04L 12/851* (2013.01)
*H04W 80/08* (2009.01)
(Continued)

(52) U.S. Cl.
CPC ............. *H04W 72/10* (2013.01); *H04L 47/14* (2013.01); *H04L 47/24* (2013.01); *H04L 47/2433* (2013.01); *H04L 47/50* (2013.01); *H04L 69/321* (2013.01); *H04W 80/02* (2013.01); *H04W 80/08* (2013.01)

(58) Field of Classification Search
CPC ...... H04W 84/18; H04W 84/12; H04W 12/06; H04W 72/1242

USPC ......................... 370/338, 235, 252
See application file for complete search history.

(56) References Cited

U.S. PATENT DOCUMENTS 6,941,392 B2 * 9/2005 Shemla ................ H04L 49/901
370/412
7,843,967 B2 11/2010 Baruah et al.
(Continued)

FOREIGN PATENT DOCUMENTS

EP 1708424 A1 10/2006

OTHER PUBLICATIONS

International Search Report and Written Opinion—PCT/US2015/056100—ISA/EPO—Jan. 14, 2016.
(Continued)

*Primary Examiner* — Jamal Javaid
(74) *Attorney, Agent, or Firm* — Loza & Loza, LLP

(57) ABSTRACT

Various aspects of the present disclosure provide for an apparatus configured for determining priority information associated with data traffic at an upper layer, mapping the data traffic to a queue at an intermediate layer based on the priority information determined at the upper layer, and mapping an endpoint associated with the queue to an access category (AC) at a lower layer based on the priority information determined at the upper layer. The priority information of the data traffic may be associated with a classification or type of data in the data traffic. The upper layer may be an application layer. The intermediate layer may be a protocol adaptation layer (PAL). The lower layer may be a media access control (MAC) layer. Various apparatuses, methods, computer-readable medium including similar features are also provided herein. Additional and alternative aspects, embodiments, and features are also provided herein.

28 Claims, 9 Drawing Sheets

(51) Int. Cl.
*H04W 80/02* (2009.01)
*H04L 29/08* (2006.01)

(56) References Cited

U.S. PATENT DOCUMENTS

| | | | |
|---|---|---|---|
| 8,243,666 | B2 | 8/2012 | Torsner et al. |
| 8,331,375 | B2 | 12/2012 | Babbar et al. |
| 8,644,770 | B2 | 2/2014 | Nandagopalan et al. |
| 2004/0114608 | A1* | 6/2004 | Rao ............... H04L 29/06 370/396 |
| 2008/0002777 | A1* | 1/2008 | Hwang ............ H04N 21/23432 375/240.27 |
| 2009/0323723 | A1* | 12/2009 | Tominaga ............... H04L 1/008 370/474 |
| 2010/0009632 | A1* | 1/2010 | Ibrahim ............... H04W 52/267 455/41.2 |
| 2013/0282938 | A1 | 10/2013 | Huang et al. |

OTHER PUBLICATIONS

Ksentini A., et al., "Toward an Improvement of H.264 Video Transmission over IEEE 802.11e Through a Cross-layer Architecture," IEEE Communications Magazine, IEEE service Center, Piscataway, US, vol. 44, No. 1, Jan. 1, 2006 (Jan. 1, 2006), pp. 107-114, XP001238792, ISSN: 0163-6804, DOI: 10.1109/MCOM .2006.1580940.

Lin C-H., et al., "An Adaptive Cross-Layer Mapping Algorithm for MPEG-4 Video Transmission over IEEE 802.11e WLAN", Telecommunication Systems, Modeling, Analysis, Deisgn and Management, Kluwer Academic Publishers, BO, vol. 42, No. 3-4, Jul. 24, 2009 (Jul. 24, 2009), pp. 223-234, XP019753801, ISSN: 1572-9451, DOI: 10.1007/S11235-009-9182-9.

Sanguankotchakorn T., et al., "A cross-layer framework for efficient MPEG-4 Video streaming over IEEE 802.11e in MANETs", The 8th Electrical Engineering/Electronics, Computer, Telecommunications and Information Technology (ECTI-CON), 2011 8th International Conference on, IEEE, May 17, 2011 (May 17, 2011), pp. 369 -372 XP032002151, DOI: 10.1109/ECTICON.2011.5947851, ISBN: 978-1-4577-0425-3.

\* cited by examiner

MAPPING DATA TRAFFIC THROUGHOUT PROTOCOL LAYERS BASED ON PRIORITY INFORMATION

TECHNICAL FIELD

Aspects of the present disclosure relate, generally, to wireless communication and, more particularly, to mapping data traffic throughout protocol layers based on priority information.

BACKGROUND

Data traffic may flow through various protocol layers prior to transmission from one apparatus to another apparatus. For example, when a communication system is represented by a series or stack of abstraction layers, the data traffic may flow from an upper layer to one or more intermediate layers. The data traffic may eventually flow to a lower layer, which may facilitate transmission of the data traffic to another apparatus.

In some circumstances, a particular type of data traffic may become congested at the lower layer. When such congestion exists, the lower layer may send a signal to a higher layer (e.g., the upper layer and/or the intermediate layer(s)) to stop (or delay) the flow of that particular type of data traffic. However, the stop (or delay) of that particular type of data traffic may also result in the stop (or delay) of another type of data traffic. The stop (or delay) of the other type of data traffic may reduce the quality of the user experience. Accordingly, existing systems may benefit from enhancements that overcome such limitations and enhance the quality of the user experience.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for an apparatus configured for determining priority information associated with data traffic at an upper layer, mapping the data traffic to a queue at an intermediate layer based on the priority information determined at the upper layer, and mapping an endpoint associated with the queue to an access category (AC) at a lower layer based on the priority information determined at the upper layer. The priority information of the data traffic may be associated with a classification or type of data in the data traffic. The upper layer may be an application layer. The intermediate layer may be a protocol adaptation layer (PAL). The lower layer may be a media access control (MAC) layer. In some configurations, two or more queues are associated with a single endpoint. In some other configurations, each queue is associated with a dedicated endpoint. An endpoint may include at least one of a bulk endpoint, an interrupt endpoint, a control endpoint, or an isochronous endpoint. An AC may include at least one of a voice AC, a video AC, a best effort AC, or a background AC. Additional and alternative aspects, embodiments, and features are also provided herein.

In various aspects of the present disclosure, a method of wireless communication by an apparatus includes determining priority information associated with data traffic at an upper layer, mapping the data traffic to a queue at an intermediate layer based on the priority information determined at the upper layer, and mapping an endpoint associated with the queue to an AC at a lower layer based on the priority information determined at the upper layer.

In various aspects of the present disclosure, an apparatus for wireless communication may include a memory and at least one processor coupled to the memory, wherein the at least one processor is configured to determine priority information associated with data traffic at an upper layer, map the data traffic to a queue at an intermediate layer based on the priority information determined at the upper layer, and map an endpoint associated with the queue to an AC at a lower layer based on the priority information determined at the upper layer.

In various aspects of the present disclosure, a computer-readable medium of an apparatus may include code for determining priority information associated with data traffic at an upper layer, mapping the data traffic to a queue at an intermediate layer based on the priority information determined at the upper layer, and mapping an endpoint associated with the queue to an AC at a lower layer based on the priority information determined at the upper layer.

In various aspects of the present disclosure, an apparatus for wireless communication may include means for determining priority information associated with data traffic at an upper layer, means for mapping the data traffic to a queue at an intermediate layer based on the priority information determined at the upper layer, and means for mapping an endpoint associated with the queue to an AC at a lower layer based on the priority information determined at the upper layer.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
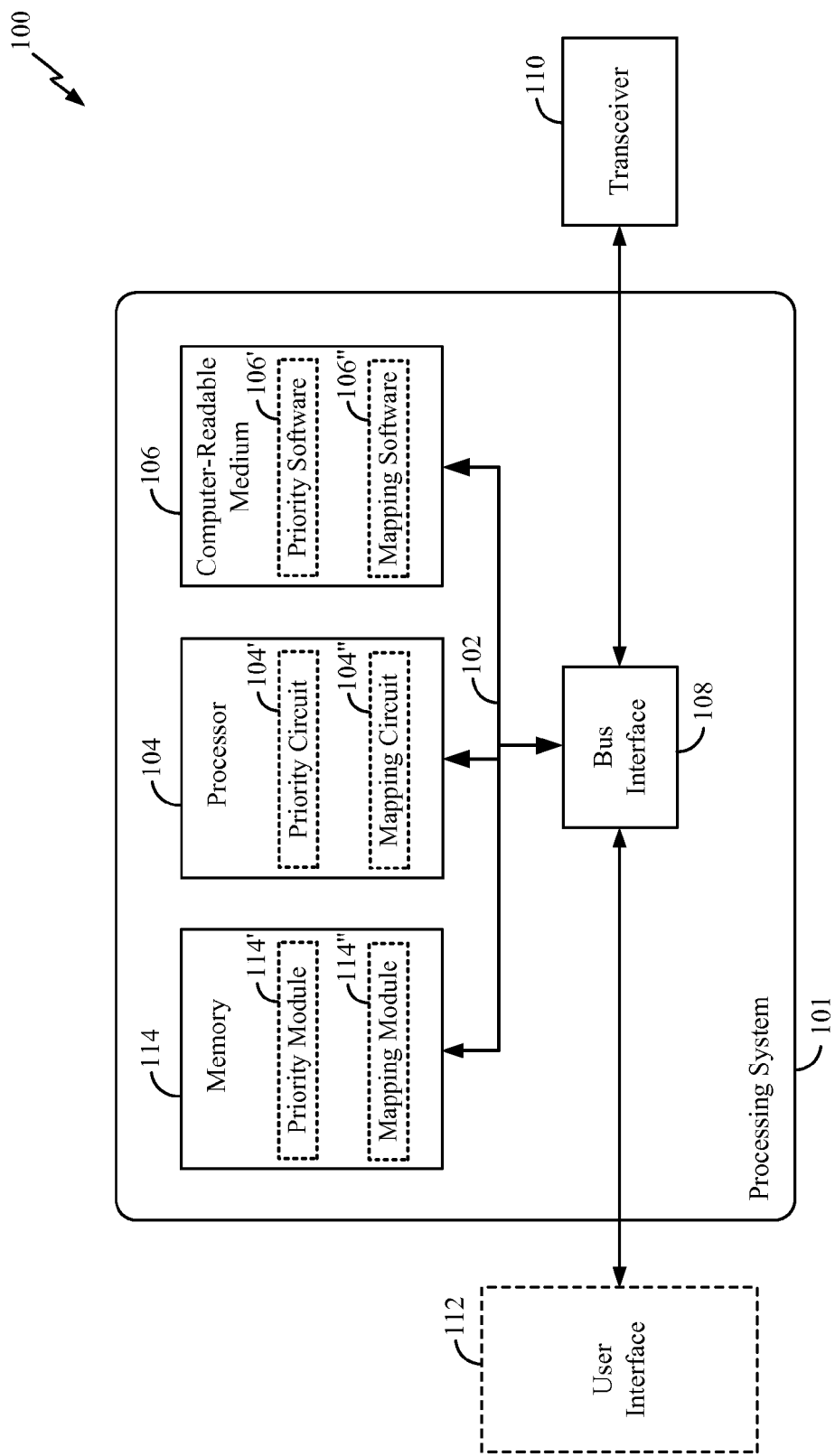
FIG. 1 is a diagram illustrating an example hardware implementation of an apparatus.

FIG. 1 is a diagram of an example hardware implementation of an apparatus 100. Generally, the apparatus 100 may be any apparatus configured to communicate with another apparatus. By way of example and not limitation, the apparatus 100 may be a cellular telephone, a smartphone, a tablet computer, a laptop computer, a desktop computer, or any other apparatus configured to communicate with another apparatus.

The apparatus 100 may include a user interface 112. The user interface 112 may be configured to receive one or more inputs from a user of the apparatus 100. The user interface 112 may also be configured to display information (e.g., text and/or images) to the user of the apparatus 100. The user interface 112 may exchange data to and/or from the processing system 101 via the bus interface 108.

The apparatus 100 may also include a transceiver 110. The transceiver 110 may be configured to receive data and/or transmit data during communication with another apparatus. The transceiver 110 provides a means for communicating with another apparatus via a transmission medium. The transceiver 110 may be configured to perform such communication using various types of technologies. One of ordinary skill in the art will understand that many types of communication technologies may be used without deviating from the scope of the present disclosure.

The apparatus 100 may also include a processing system 101. The processing system 101 may include memory 114, one or more processors 104, a computer-readable medium 106, and a bus interface 108. The bus interface 108 may provide an interface between the bus 102 and the transceiver 110. The memory 114, the one or more processors 104, the computer-readable medium 106, and the bus interface 108 may be connected together via the bus 102.

The memory 114 may include a priority module 114'. The priority module 114' may include information associated with the priority of data traffic. Such information may be referred to herein as priority information. The priority information of the data traffic may include Quality of Service (QoS) information associated with the data traffic. For example, some data traffic may require a specific bit rate, a specific delay, a specific jitter, a specific packet loss rate, and/or a specific bit error rate. The processing system 101 may utilize the QoS information to assign the priority (e.g., importance) to various portions of the data traffic. When network capacity (e.g., network bandwidth) is not sufficient to transmit all of the data traffic ready for transmission, the processing system 101 may utilize the QoS information to determine the sequence in which various portions of such data traffic will be transmitted. For instance, a portion of data traffic having the highest priority (e.g., QoS information associated with the highest priority) may be transmitted before another portion of data traffic not having the highest priority (e.g., QoS information not associated with the highest priority). The description provided above describes various examples of relationships between the priority information of data traffic and the QoS information associated with data traffic. However, the meaning of the term "priority" or "priority information" is not intended to be limited by virtue of the examples provided above. One of ordinary skill in the art will understand that other relationships, associations, and/or attributes may be exist with respect to the "priority" and/or the "priority information" of the data traffic without deviating from the scope of the present disclosure.

The memory 114 may also include a mapping module 114". The mapping module 114" may include information related to various queues, endpoints, and/or access categories (ACs) described in greater detail herein. For example, the mapping module 114" may include information related to the mapping of various type of data traffic at the intermediate layer based on priority information. The mapping module 114" may also include information related to the mapping of an endpoint to an AC at a lower layer based on the priority information. Such priority information may be similar to the priority information described above with reference to the priority module 114'.

Various features described above with reference to the memory 114 may be similar to various features of the processor 104 and/or the computer-readable medium 106. As an example, various features described above with reference to the priority module 114' may be similar to the priority circuit 104' and/or the priority software 106'. In some configurations, the priority circuit 104' may implement various instructions included in the priority software 106'. In some configurations, the priority circuit 104' may read information from and/or store information in the priority module 114'. As another example, various features described above with reference to the mapping module 114" may be similar to the mapping circuit 104" and/or the mapping software 106". In some configurations, the mapping circuit 104" may implement the instructions included in the mapping software 106". In some configurations, the mapping circuit 104" may read information from and/or store information in the mapping module 114".

One of ordinary skill in the art will further understand that the apparatus 100 may include alternative and/or additional elements without deviating from the scope of the present disclosure. In accordance with various aspects of the present disclosure, an element, or any portion of an element, or any combination of elements may be implemented with a processing system 101 that includes one or more processors 104. Examples of the one or more processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system 101 may be implemented with a bus architecture, represented generally by the bus 102 and bus interface 108. The bus 102 may include any number of interconnecting buses and bridges depending on the specific application of the processing system 101 and the overall design constraints. The bus 102 may link together various circuits including one or more processors (represented generally by the one or more processors 104), the memory 114, and computer-readable media (represented generally by the computer-readable medium 106). The bus 102 may also link various other circuits such as timing sources, peripherals, voltage regulators, and power management circuits, which are well known in the art, and therefore, will not be described further herein.

The one or more processors 104 are responsible for managing the bus 102 and general processing, including the execution of software stored on the computer-readable medium 106. The software, when executed by the one or more processors 104, causes the processing system 101 to perform the various functions described below for any one or more apparatuses. The computer-readable medium 106 may also be used for storing data that is manipulated by the one or more processors 104 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may also include, by way of example, a carrier wave, a transmission line, and any other suitable medium for transmitting software and/or instructions that may be accessed and read by a computer. The computer-readable medium 106 may reside in the processing system 101, external to the processing system 101, or distributed across multiple entities including the processing system 101. The computer-readable medium 106 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 2A:
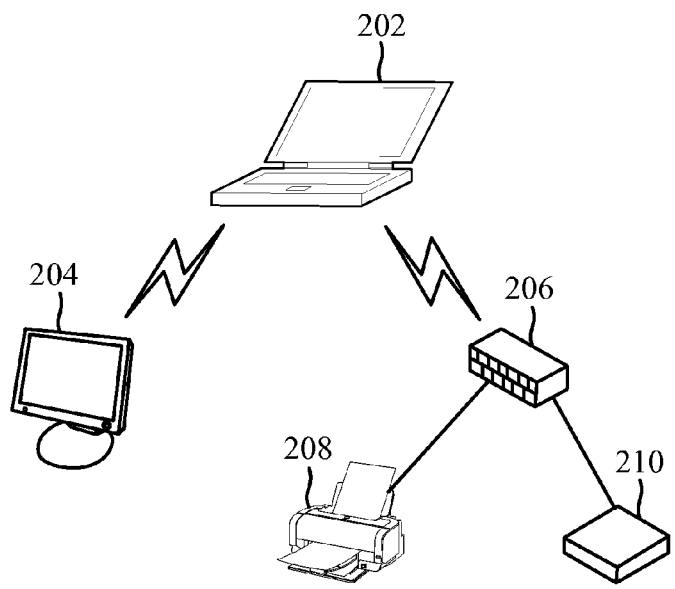
FIGS. 2A-2B are diagrams illustrating an example of a topology of various apparatuses in a communication network.
Figure 2B:
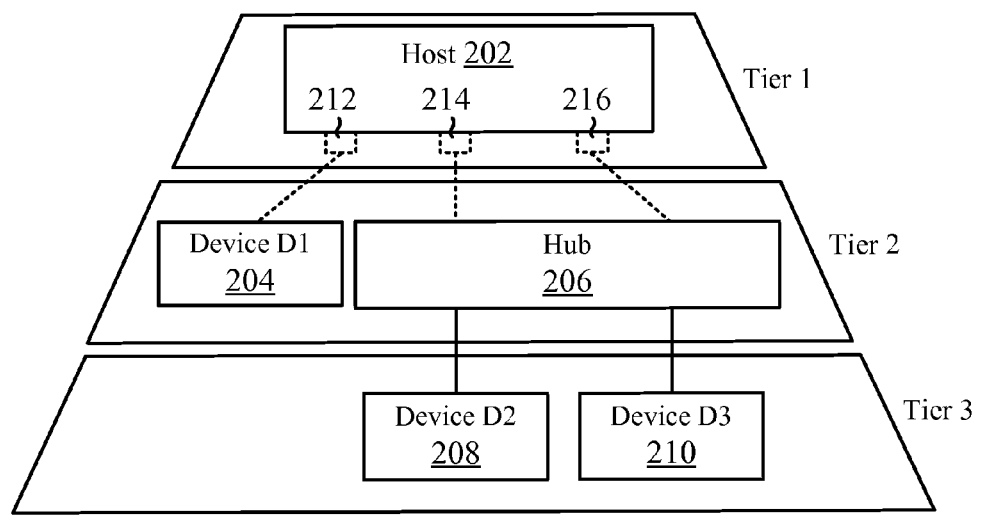

FIGS. 2A-2B are diagrams illustrating an example of a topology of various apparatuses in a communication network. The apparatuses include a host 202 (e.g., a laptop computer), a hub 206 (e.g., a router), and various devices, such as device D1 204 (e.g., a display device), device D2 208 (e.g., a printer device), and device D3 210 (e.g., a storage device). One of ordinary skill in the art will understand that the communication network may include fewer or additional apparatuses relative to the apparatuses illustrated in FIGS. 2A-2B without deviating from the scope of the present disclosure. The communication network may include various tiers, such as Tier 1, Tier 2, and Tier 3, as illustrated in FIG. 2B.

Tier 1 may include the host 202. The host 202 may include a root hub providing various virtual root hub ports 212, 214, 216. The host 202 may communicate wirelessly with one or more devices in Tier 2 via the virtual root hub ports 212, 214, 216. For example, virtual root hub 212 may communicate wirelessly with device D1 204 (e.g., the display device) in Tier 2, and virtual root hubs 214, 216 may communicate wirelessly with the hub 206 (e.g., the router) in Tier 2.

The hub 206 (e.g., the router) may enable communication with downstream devices. For example, the hub 206 (e.g., the router) in Tier 2 may communicate with devices in Tier 3. The hub 206 (e.g., the router) may communicate with the device D2 208 (e.g., the printer device) and the device D3 210 (e.g., the storage device). Some communications received by a device in Tier 3 may originate from a host in Tier 1. For example, the communication received by device D2 208 (e.g., the printer device) may originate from the host 202, and the communication received by device D3 210 (e.g., the storage device) may also originate from the host 202.

One of ordinary skill in the art will understand that the example illustrated in FIGS. 2A-2B is provided for illustrative purposes and is not intended to limit the scope of the present disclosure. A communication network may have alternative configurations without deviating from the scope of the present disclosure. An example of another communication network within the scope of the present disclosure is provided in FIGS. 3A-3B.

Figure 3A:
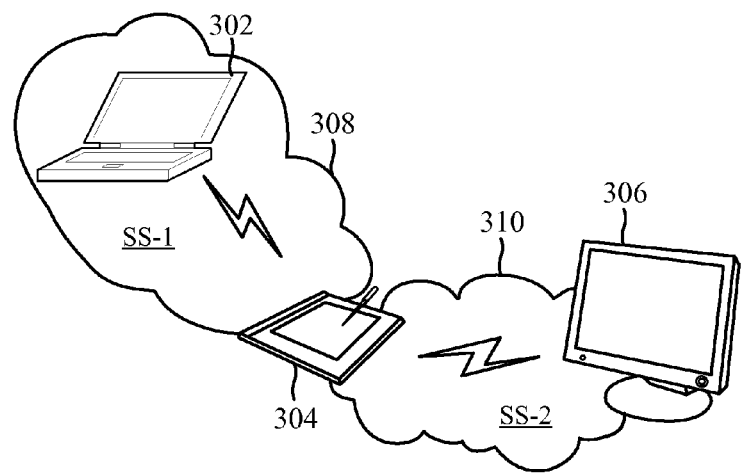
FIGS. 3A-3B are diagrams illustrating another example of a topology of various apparatuses in a communication network.
Figure 3B:
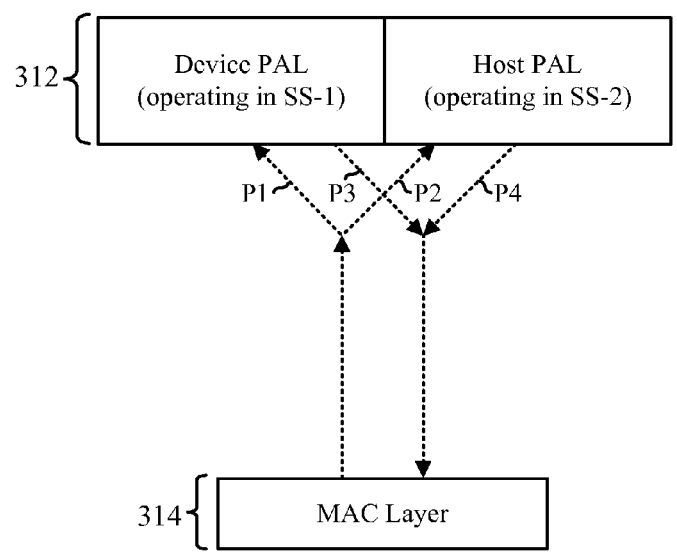

FIGS. 3A-3B are diagrams illustrating another example of a topology of various apparatuses in a communication network. The communication network may include various service sets. For example, the communication network may include a first service set (SS-1) 308 and a second service set (SS-2) 310. Together, the service sets may form a basic service set (BSS). In some configurations, communication in the BSS may be performed in accordance with the protocols of the communication standard sometimes referred to as Institute of Electrical and Electronics Engineers (IEEE) 802.11. One of ordinary skill in the art will understand that communication may, additionally and/or alternatively, be performed in accordance with protocols of other communication standards without deviating from the scope of the present disclosure. Accordingly, any reference herein to IEEE 802.11 is provided for illustrative purposes and shall not be construed as a limitation of the present disclosure.

In some configurations, a single apparatus may perform the operations of a host as well as a device. In FIG. 3A, a non-limiting example of such an apparatus is illustrated as a tablet computer 304. The tablet computer 304 may communicate with the laptop computer 302 in SS-1 308 and may also communicate with the display device 306 in SS-2 310. The tablet computer 304 may operate as a device (e.g., similar to device D1 204, device D2 208, device D3 210) with respect to the laptop computer 302 in SS-1 308. The tablet computer 304 may also operate as a host (e.g., similar to host 202) with respect to the display device 306 in SS-2 310.

More specifically, FIG. 3B illustrates communications between a protocol adaptation layer (PAL) 312 and a media access control (MAC) layer 314 of the tablet computer 304 illustrated in FIG. 3A. As illustrated in FIG. 3B, the PAL 312 may include a device PAL operating in SS-1 308 as well as a host PAL operating in SS-2 310. A first data packet (P1) may be transmitted from the MAC layer 314 to the device PAL operating in SS-1 308. For example, the laptop computer 302 in SS-1 308 may transmit P1 to the tablet computer 304. A second data packet (P2) may be transmitted from the MAC layer 314 to the host PAL operating in SS-2 310. For example, the display device 306 may transmit P2 to the tablet computer 304. A third data packet (P3) may be transmitted from the device PAL operating in SS-1 308 to the MAC layer 314. For example, the tablet computer 304 may transmit P3 to the laptop computer 302. A fourth data packet (P4) may be transmitted from the host PAL operating in SS-2 310 to the MAC layer 314. For example, the tablet computer 304 may transmit P4 to the display device 306. FIGS. 3A-3B illustrate a non-limiting example of a single apparatus (e.g., tablet computer 304) operating as a device as well as a host. However, such a configuration is provided for illustrative purposes and shall not limit the scope of the present disclosure.

Figure 4:
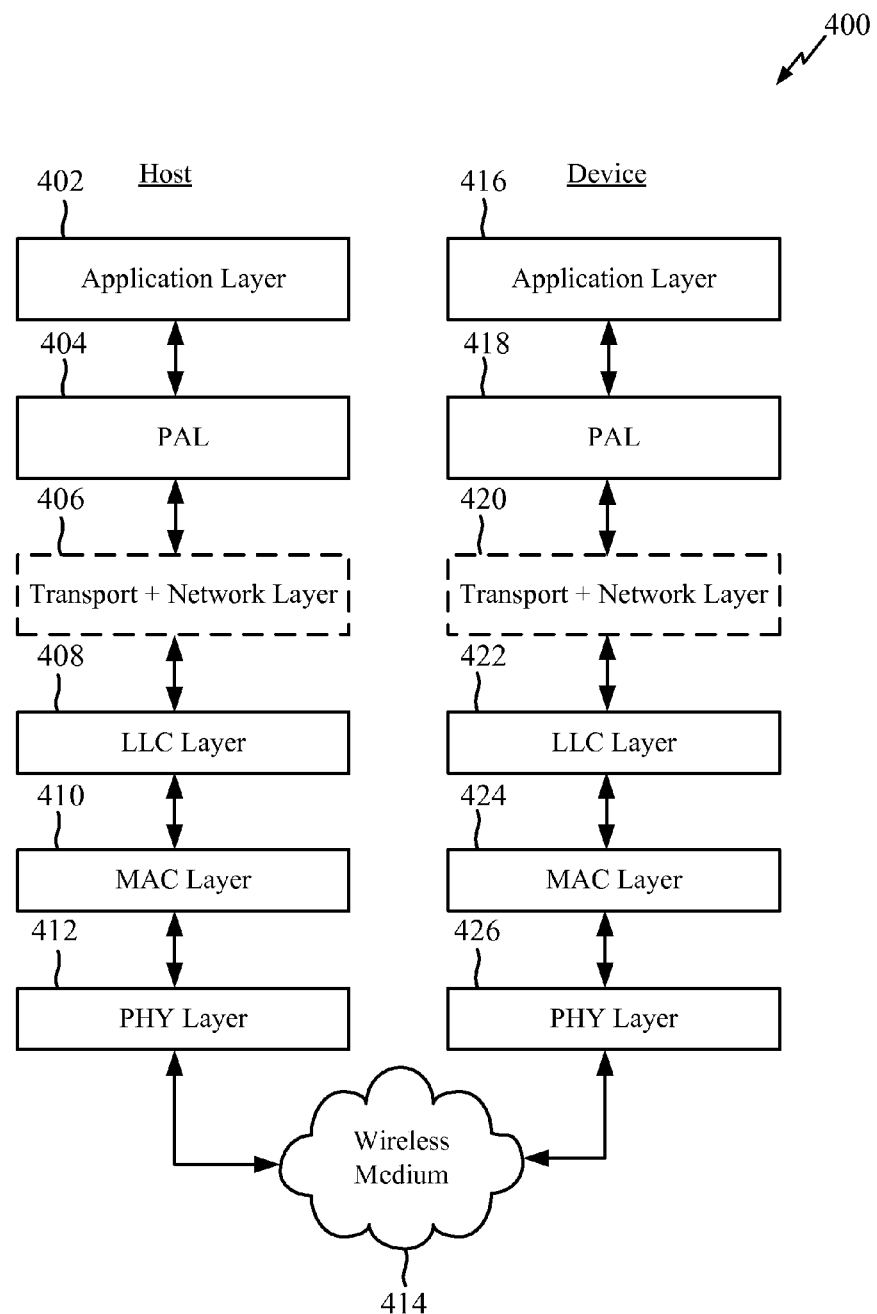
FIG. 4 is a diagram illustrating an example of various protocol layers of a communication system.

FIG. 4 is a diagram 400 illustrating an example of various protocol layers of a communication system. The protocol layers illustrated in FIG. 4 may be utilized by a host and/or a device, which are described above with reference to FIGS. 2A-2B and FIGS. 3A-3B. However, the various protocol layers illustrated in FIG. 4 shall not be construed as a limitation of the present disclosure. One of ordinary skill in the art will understand that fewer, additional, and/or alternative protocol layers may be implemented without deviating from the scope of the present disclosure. For instance, various protocol layers not illustrated in FIG. 4 may exist between any of the layers illustrated in FIG. 4 without deviating from the scope of the present disclosure. One of ordinary skill in the art will also understand that such protocol layers may be utilized in various configurations, even if not illustrated in FIG. 4, without deviating from the scope of the present disclosure.

In some configurations, data traffic may flow from an upper layer (e.g., application layer 402) to an intermediate layer, such as a PAL 404. An example of a PAL 404 is a media agnostic (MA) universal serial bus (USB) PAL. The MA USB PAL may enable connectivity between a USB host and one or more USB devices, including USB hubs, over wireless mediums, such as IEEE 802.11 and/or Internet protocol (IP) links. The PAL 404 may also perform other functions and/or include other features not described herein without deviating from the scope of the present disclosure. The data traffic may flow from the PAL 404 to another layer, such as the transport and network layer 406.

The transport and network layer 406 may facilitate the flow of the data traffic to one or more devices via IP links. For example, a host and a device may be separated by an IP network. The host and the device may be direct clients of a transmission control protocol (TCP). The data traffic may be packaged into IP datagrams and delivered through TCP connections. However, the transport and network layer 406 may not exist in all configurations of the present disclosure, such as when the data traffic is not being transmitted from the host to the device via IP links. The transport and network layer 406 may also perform other functions and/or include other features not described herein without deviating from the scope of the present disclosure.

The data traffic may flow to a logical link control (LLC) layer 408. The LLC layer 408 may be the upper sublayer of a data link layer. The LLC layer 408 may provide multiplexing mechanisms to enable various network protocols to coexist within a multipoint network and to be transported over the same network medium. The LLC layer 408 may also control data flows as well as provide error management. The LLC layer 408 may also perform other functions and/or include other features not described herein without deviating from the scope of the present disclosure. The LLC layer 408 interface between a network layer (e.g., transport and network layer 406) and a MAC layer (e.g., MAC layer 410).

The data traffic may flow from the LLC layer 408 to the MAC layer 410. The MAC layer 410 may be the lower sublayer of the data link layer. The MAC layer 410 may provide addressing and channel access control mechanisms that enable various terminals or network nodes to communicate within a multiple-access network having a shared medium (e.g., a wireless medium according to IEEE 802.11). The MAC layer 410 may emulate a full-duplex logical communication channel in a multi-point network, and such a channel may provide unicast, multicast, and/or broadcast communication service(s). The MAC layer 410 may also perform other functions and/or include other features not described herein without deviating from the scope of the present disclosure. The MAC layer 410 may interface between a LLC layer (e.g., LLC layer 408) and a network physical (PHY) layer (e.g., PHY layer 412).

The PHY layer 412 may include network hardware transmission technologies. The PHY layer 412 may provide the means for transmitting data traffic. The PHY layer 412 may provide an electrical, mechanical, and/or procedural interface to the transmission medium. The PHY layer 412 may specify various attributes of the data traffic, such as the frequency on which the data traffic is transmitted, the modulating scheme of the data traffic, and other related attributes of the data traffic. The PHY layer 412 may also perform other functions and/or include other features not described herein without deviating from the scope of the present disclosure. The PHY layer 412 may transmit the data traffic to the device via the wireless medium 414. The wireless medium 414 may be in accordance with IEEE 802.11. The wireless medium 414 may also be in accordance with various other technologies. The wireless medium 414 may interface between the PHY layer 412 of the host as well as the PHY layer 426 of the device.

With respect to the device, data traffic may flow from the application layer 416 to the PAL 418. Data traffic may also flow to the transport and network layer 420 and eventually to the LLC layer 422. Data traffic may also flow to the MAC layer 424 and eventually to the PHY layer 426. A description of various features and/or functions of such layers in the device is provided above with reference to the host and, therefore, will not be repeated.

Figure 5:
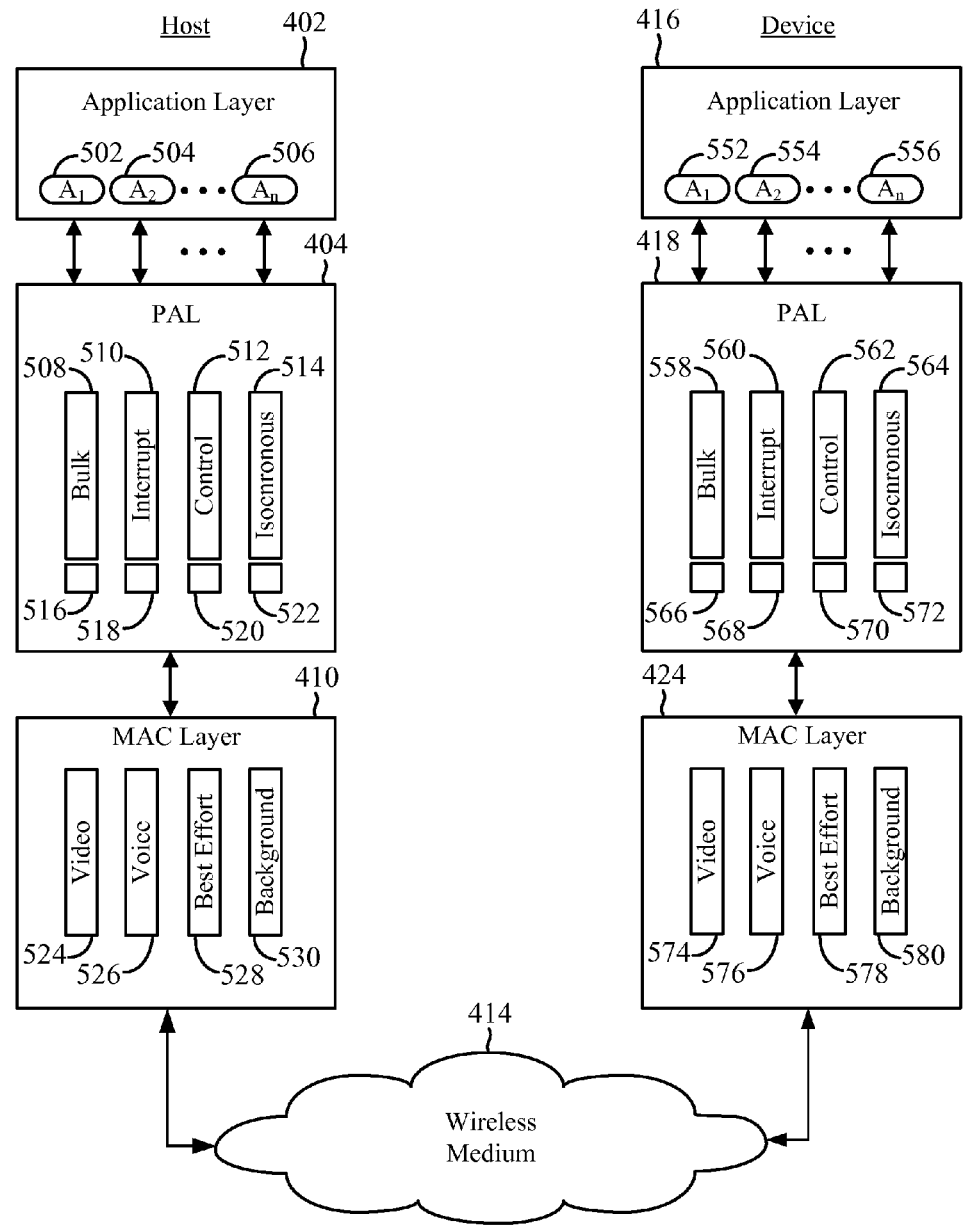
FIG. 5 is a diagram illustrating an example of features of various protocol layers illustrated in FIG. 4.

FIG. 5 is a diagram illustrating an example of features of various protocol layers illustrated in FIG. 4. One of ordinary skill in the art will understand that various other protocol layers may be included without deviating from the scope of the present disclosure. The data traffic at the application layer 402 may include one or more portions. For example, the data traffic may include portions $A_1$ 502, $A_2$ 504, and $A_3$ 506. The data traffic may include additional or fewer portions without deviating from the scope of the present disclosure. The type of data included in some portion(s) of the data traffic may be different relative to some other portion(s) of the data traffic. For example, one portion (e.g., $A_1$ 502) may include video data traffic, and another portion (e.g., $A_2$ 504) may include file transfer data traffic. Furthermore, one type of data traffic may have a different priority relative to another type of data traffic. For example, video data traffic may have a higher priority relative to file transfer data traffic. In existing systems, the data traffic at an upper layer (e.g., application layer 402) may flow to an intermediate layer (e.g., PAL 404) according to a first-in, first-out (FIFO) organization, wherein an older portion (e.g., $A_1$ 502) of the data traffic may flow to an intermediate layer (e.g., PAL 404) prior to a newer portion (e.g., $A_2$ 504) of the data traffic.

After the data traffic flows to the intermediate layer (e.g., PAL 404), the data traffic may be added to various queues. As a non-limiting example, the PAL 404 may include a bulk queue 508, an interrupt queue 510, a control queue 512, and an isochronous queue 514. One of ordinary skill in the art will understand that additional, fewer, and/or alternative queues may be implemented without deviating from the scope of the present disclosure.

The PAL 404 may include an endpoint associated with a queue. A particular endpoint may be associated with a particular queue because, for example, data traffic may flow from that particular queue to that particular endpoint. That is, data traffic may be transferred from that particular queue to that particular endpoint, where it will be stored until it is read by a microcontroller (e.g., the processor 104). The PAL 404 may include a bulk endpoint 516 associated with the bulk queue 508. The PAL 404 may also include an interrupt endpoint 518 associated with the interrupt queue 510. The PAL 404 may further include a control endpoint 520 associated with the control queue 512. The PAL 404 may also include an isochronous endpoint 522 associated with the isochronous queue 514.

An endpoint may include a portion of the data traffic that will flow to a lower layer (e.g., MAC layer 410). An endpoint may be a source of data or a destination of data. That is, data stored at an endpoint may be received from a host or may be waiting to be sent to a device. An endpoint may occur at the end of a communication channel. An endpoint may be configured to support various types of data transfers (e.g., control transfers, interrupt transfers, isochronous transfers, and bulk transfers). An endpoint may function as a type of buffer. A microcontroller (e.g., the processor 104) may read the data stored at the endpoint. The number of endpoints and the capability of each endpoint may be defined by the underlying hardware and/or software of the device.

Various descriptive terms (e.g., bulk, interrupt, control, isochronous) provided herein may refer to the type of transfer of data. Each type of transfer may have various characteristics that differentiate it from another type of transfer. For instance, a control transfer may include bi-directional transfers reserved for the host to send configuration information to the device as well as for the host to request configuration information from the device. Application software may not utilize this type of transfer. In comparison, an interrupt transfer may have a limited latency to or from a device, and an interrupt transfer may have a defined polling rate. Interrupt transfers may include event notifications, characters, or coordinates from a pointing device. In contrast, isochronous transfers may be utilized for transmitting real-time information, such as audio data and video data, and such transmissions may be sent at a constant rate. Isochronous transfers of data streams may be allocated a dedicated portion of an available bandwidth to ensure that the data streams are delivered at a desired rate. Isochronous transfers may lack error detection. In comparison, bulk transfers may include data not otherwise transferred via control transfers, interrupt transfers, and isochronous transfers. Bulk transfers may utilize error detection, but may lack a defined polling rate. Bulk transfers may utilize all of the available bandwidth (after the other types of transfers have been completed). One of ordinary skill in the art will understand that the description of the various examples of queues, endpoints, and transfers is provided for illustrative purposes and is not intended to limit the scope of the present disclosure. Alternative queues, endpoints, and/or transfers may be utilized without deviating from the scope of the present disclosure.

As discussed above, existing systems may organize data traffic according to a FIFO organization. For instance, a portion of the data traffic that flows earliest to the PAL 404 will be lower in a particular queue at the PAL 404 relative to another portion of the data traffic that flows later to the PAL 404. That is, the portion of the data traffic that flows earliest to the PAL 404 will be closest to the endpoint of that queue relative to another portion of the data traffic that flows later to the PAL 404. Accordingly, the earlier portion will flow sooner to a lower layer (e.g., MAC layer 410) relative to another portion of the data traffic that flows later to the PAL 404.

The MAC layer 410 (e.g., IEEE 802.11 MAC) may include various ACs. The ACs may include various features and characteristics defined in various communication standards (e.g., IEEE 802.11). With respect to IEEE 802.11, various levels of priority defined in Enhanced Distributed Channel Access (EDCA) may be referred to as ACs. With respect to EDCA, higher-priority traffic may have a higher probability of being transmitted relative to the transmission probability of lower-priority traffic. That is, higher-priority data traffic may be given preferential access to a channel of the transmission medium (e.g., wireless medium 414) relative to lower-priority data traffic. For instance, a station (STA) may wait less time before transmitting a data packet containing higher-priority data traffic relative to the amount of time the STA may wait to transmit a data packet containing lower-priority data traffic. As such, higher-priority data traffic may be in a category that is different from the category of lower-priority data traffic.

The ACs may include a video AC 524, a voice AC 526, a best effort AC 528, and a background AC 530. The priority of the data traffic in one AC may be different from the priority of the data traffic in another AC. For example, the priority of the data traffic in voice AC 526 may be higher than the priority of the data traffic in video AC 524. As another example, the priority of the data traffic in video AC 524 may be higher than the priority of the data traffic in best effort AC 528. As yet another example, the priority of the data traffic in best effort AC 528 may be higher than the data traffic in the background AC 530.

The data traffic at the MAC layer 410 may be transmitted via the wireless medium 414 to the MAC layer 424 of the device. The device includes protocol layers that are similar to the protocol layers of the host. With respect to the device, portions (e.g., $A_1$ 552, $A_2$ 554, $A_3$ 556) of the data traffic may flow from an upper layer (e.g., application layer 426) to an intermediate layer, such as the PAL 418. As described above, existing systems may organize data traffic according to a FIFO organization. A queue (e.g., bulk queue 558, interrupt queue 560, control queue 562, and isochronous queue 564) may be associated with an endpoint (e.g., bulk endpoint 566, interrupt endpoint 568, control endpoint 570, isochronous endpoint 572). The data traffic may flow from the PAL 418 to a lower layer, such as the MAC layer 424 (e.g., IEEE 802.11 MAC). The MAC layer 424 may include a video AC 574, a voice AC 576, a best effort AC 578, and a background AC 580. The data traffic may flow from the MAC layer 424 of the device to another apparatus (e.g., the host) via the wireless medium 414.

Figure 6:
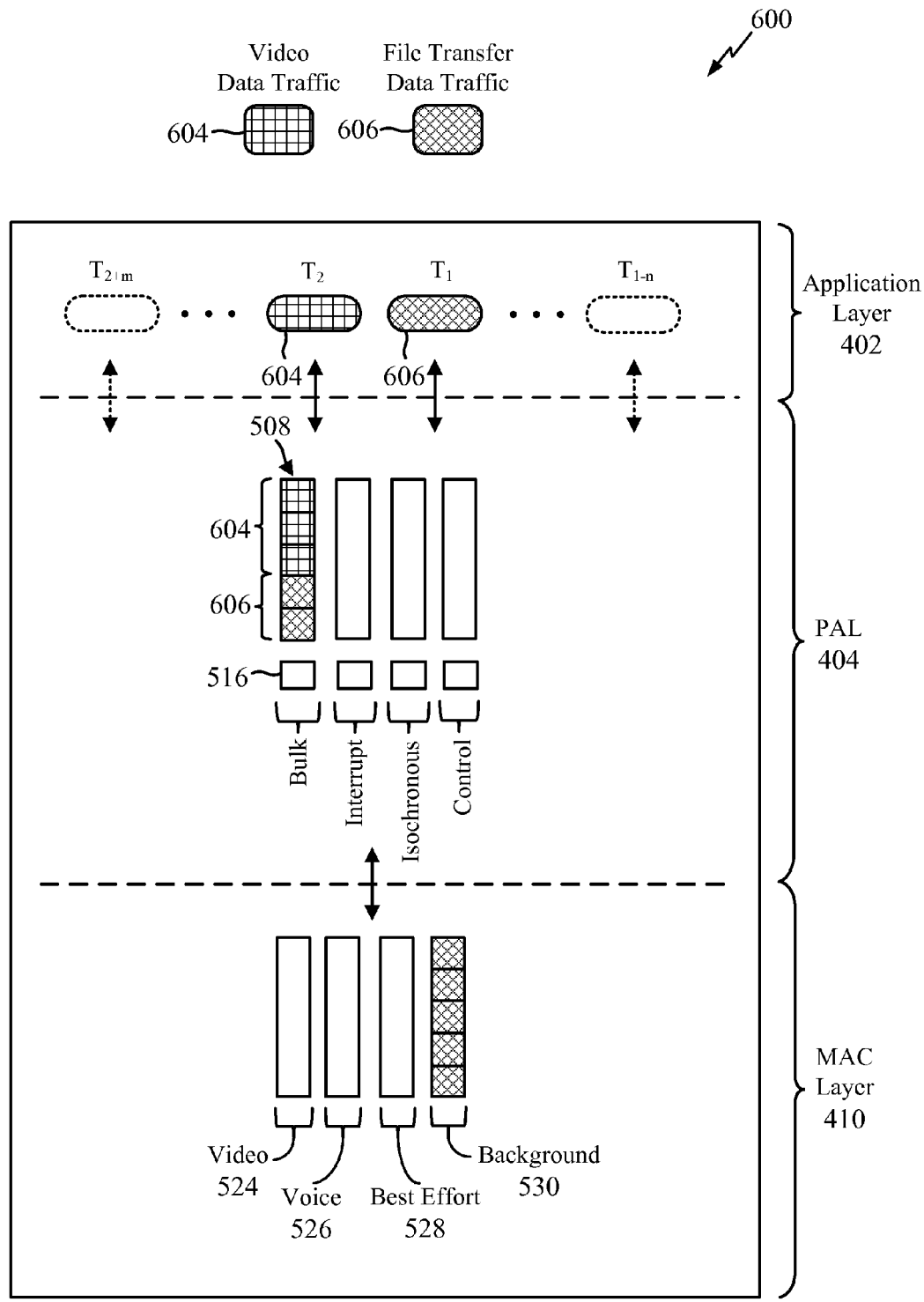
FIG. 6 is a diagram illustrating a first example of the flow of data traffic throughout the protocol layers illustrated in FIG. 5.

FIG. 6 is a diagram 600 illustrating a first example of the flow of data traffic throughout the protocol layers illustrated in FIG. 5. A portion 606 of the data traffic may be available at the application layer 402 at time $T_1$. At a later time, $T_2$, another portion 604 may be available at the application layer 402. Other portions may also be available at the application layer 402 at various other times, such as time $T_{1-n}$ and time $T_{2+m}$. The portion 604 may include video data traffic, and the portion 606 may include file transfer data traffic. As described in greater detail above, the data traffic at the upper layer (e.g., application layer 402) may flow to an intermediate layer (e.g., PAL 404) according to a FIFO organization, wherein an older portion (e.g., portion 606, which includes the file transfer data traffic) flows to the intermediate layer (e.g., PAL 404) prior to a newer portion (e.g., portion 604, which includes the video data traffic). Accordingly, at the PAL 404, the portion 606 (which includes the file transfer data traffic) has a lower position in the bulk queue 508 relative to the position of the portion 604 (which includes the video data traffic). As such, the portion 606 (which includes the file transfer data traffic) will reach the bulk queue endpoint 516 prior to the time that the portion 604 (which includes the video data traffic) reaches the bulk endpoint 516.

Under certain circumstances, the data traffic at the MAC layer 410 may become congested. The data traffic at the MAC layer 410 may become congested when one or more of the ACs at the MAC layer 410 cannot accommodate more data traffic. For example, as illustrated in FIG. 6, the background AC 530 cannot accommodate any more file transfer data traffic. When congestion exists at the MAC layer 410, the MAC layer 410 may send a signal to a higher layer (e.g., PAL 404) to stop the flow of the data type associated with the congestion. For example, the MAC layer 410 may send a signal to the PAL 404 to stop the flow of file transfer data traffic. Such a signal may assist with a reduction of congestion of file transfer data traffic at the MAC layer 410. However, such a signal delays the processing of the video data traffic. Because the video data traffic (included in portion 604) is in a higher portion of the bulk queue 508 at the PAL 404, the video data traffic cannot reach the bulk endpoint 516 to ultimately flow to the video AC 524 (where no congestion exists) until after all of the file transfer data traffic (included in portion 606) has reached the bulk endpoint 516 and flowed to the background AC 530 (where the congestion exists).

In some configurations, the video data traffic (included in the portion 604) may have a higher priority than the priority of the file transfer data traffic (included in the portion 606). Accordingly, during the congestion described above, a portion of the data traffic having a higher priority (e.g., portion 604, which includes video data traffic) is unable to reach the appropriate AC (e.g., video AC 524) at the MAC layer 410 because of congestion associated with a portion of the data traffic having a lower priority (e.g., portion 606, which includes the file transfer data traffic). Existing systems do not determine the priority of the various portions of the data traffic at the upper layer (e.g., application layer 402) and/or the intermediate layer (e.g., PAL 404), and existing systems do not utilize such priority information to map the various portions of the data traffic throughout the protocol layers. As described in greater detail below, mapping may include distributing or routing data traffic from a portion of one protocol layer to a portion of another protocol layer. Congestion of relatively low priority data traffic (e.g., file transfer data traffic) at the MAC layer 410 causes a stop (or delay) in the flow of data traffic (e.g., video data traffic) having a relatively higher priority, which results in a reduction of the quality of the user experience. For instance, the user will experience a stop (or delay) in the display of video content (because of congestion of file transfer data traffic).

Figure 7:
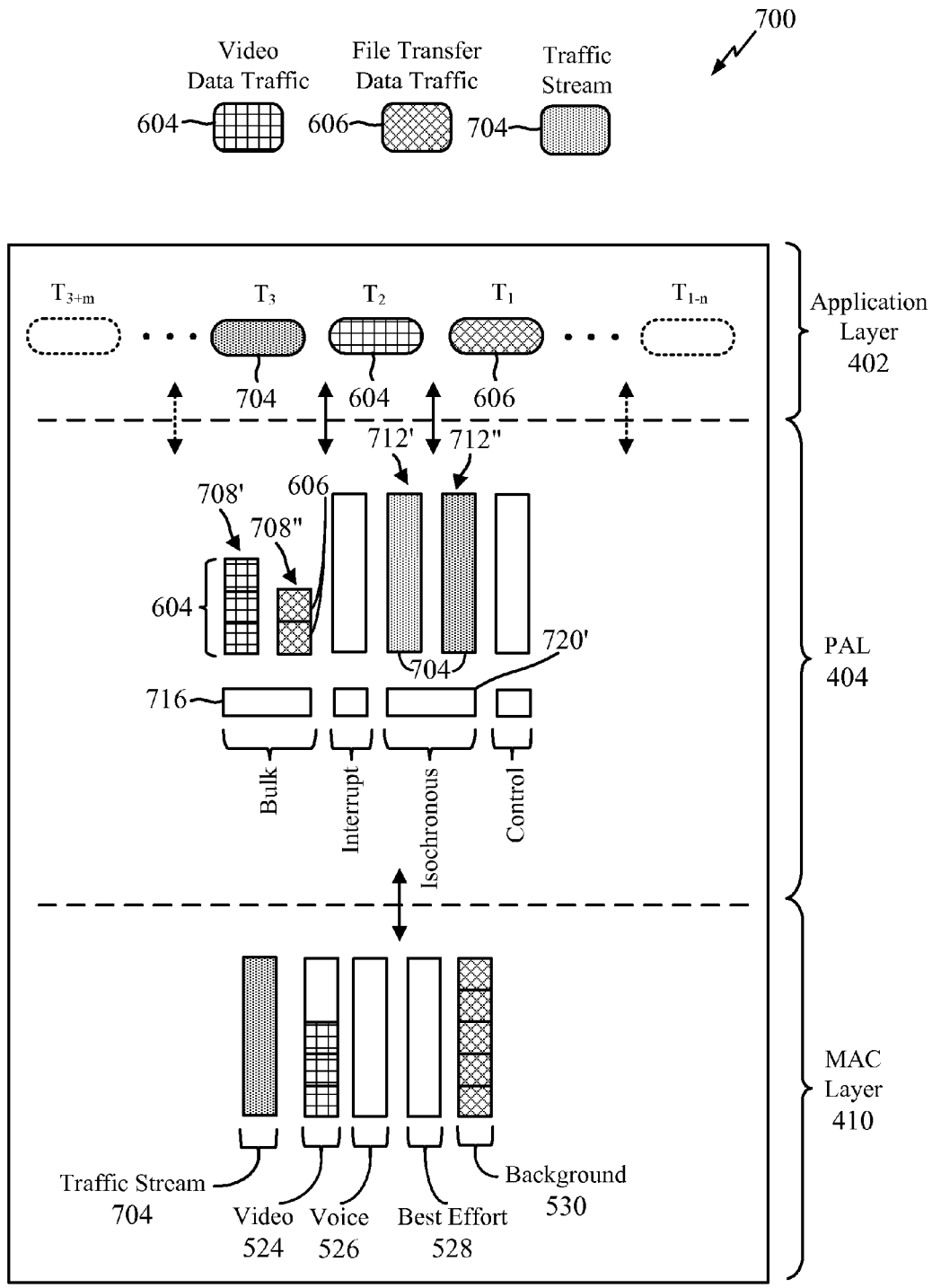
FIG. 7 is a diagram illustrating a second example of the flow of data traffic throughout the protocol layers illustrated in FIG. 5.

FIG. 7 is a diagram 700 illustrating a second example of the flow of data traffic throughout the protocol layers illustrated in FIG. 5. According to various configuration of the present disclosure, the priority of various portions of the data traffic may be determined at an upper layer, such as the application layer 402. For example, the priority of the portion 604 (which includes video data traffic) and the priority of the portion 606 (which includes the file transfer data traffic) are determined at the application layer 402. In some configurations, the priority of the portion 604 (which includes video data traffic) is higher than the priority of the portion 606 (which includes the file transfer data traffic). One of ordinary skill in the art will understand that additional data portions may exist and the priority of such data portions may also be determined without deviating from the scope of the present disclosure.

Based on the priority determined at the upper layer (e.g., application layer 402), various portions of the data traffic are mapped to queues at an intermediate layer, such as the PAL 404. Accordingly, the portion 604 (which includes the video data traffic) is mapped to bulk queue 708', and the portion 606 (which includes the file transfer data traffic) is mapped to bulk queue 708". As described above, mapping may include distributing or routing data traffic from a part of one protocol layer to a part of another protocol layer. For example, the portion 604 of the data traffic of the application layer 402 is distributed or routed to the bulk queue 708' of the PAL 404. As another example, the portion 606 of the data traffic of the application layer 402 is distributed or routed to the bulk queue 708" of the PAL 404. In some configurations, as illustrated in FIG. 7, two or more queues may be associated with a single endpoint. For example, bulk queue 708' and bulk endpoint 708" are associated with bulk endpoint 716.

Based on the priority determined at the upper layer (e.g., application layer 402), the endpoint associated with the queue is mapped to an AC at a lower layer, such as the MAC layer 410. For example, the bulk endpoint 716 associated with bulk queue 708' is mapped to video AC 524. As another example, the bulk endpoint 716 associated with bulk endpoint 708" is mapped to background AC 530. As described above, mapping may include distributing or routing data traffic from a part of one protocol layer to a part of another protocol layer. For example, the portion 604 of the data traffic is distributed or routed from the bulk endpoint 716 to the video AC 524 of the MAC layer 410. As another example, the portion 606 of the data traffic is distributed or routed from the bulk endpoint 716 to the background AC 530 of the MAC layer 410.

The example illustrated in FIG. 7 shows that various portions of the data traffic are mapped to queues at an intermediate layer (e.g., PAL 404) based on the priority determined at an upper layer (e.g., application layer 402). The example illustrated in FIG. 7 also shows that the endpoints are mapped to ACs at the intermediate layer (e.g., MAC layer 410) based on the priority determined at the upper layer (e.g., application layer 402). Accordingly, the priority determined at an upper layer (e.g., application layer 402) flows throughout various other protocol layers, such as the intermediate layer (e.g., PAL 404) and the lower layer (e.g., MAC layer 410). In such a configuration, congestion at some portion of the lower layer (e.g., MAC layer 410) will not stop (or delay) the flow of some other portions of the data traffic at higher layers (e.g., application layer 402 and/or PAL 404). For example, congestion at the background AC 530 of the MAC layer 410 will not necessarily stop (or delay) the flow of the video data traffic (which is included in portion 604) at the PAL 404. Accordingly, a portion of the data traffic having a lower priority (e.g., portion 606, which includes file transfer data traffic) will not cause a stop (or delay) of the flow of another portion of the data traffic having a higher priority (e.g., portion 604, which includes video data traffic). Such configurations may improve the quality of the user experience. For instance, the user may be less likely to experience a stop (or delay) in the display of video content even if there exists congestion with respect to file transfer data traffic.

In some configurations, the data traffic may include a parameterized traffic stream. For example, a portion 704 of the data traffic may include a parameterized traffic stream. A parameterized traffic stream may have one or more attributes that are to be met or controlled during the transmission of data from one apparatus to another apparatus. For example, such attributes may include, but are not limited to, a specific bandwidth, a specific latency, a specific jitter, and/or various other related attributes. In some configurations, the mapping of the data traffic to a queue at the intermediate layer (e.g., PAL 404) may include mapping the parameterized traffic stream to a dedicated queue at the intermediate layer (e.g., PAL 404). For example, the portion 704 (which includes the parameterized traffic stream) may be mapped to isochronous queues 712', 712". Because isochronous queues 712', 712" do not include any type of data other than the parameterized traffic stream of the portion 704, such queues may be referred to as dedicated queues. In some configurations, the mapping of the endpoint to an AC at the lower layer (e.g., MAC layer 410) may include mapping the parameterized traffic stream to a dedicated AC at the lower layer (e.g., MAC layer 410). For example, the portion 704 (which includes the parameterized traffic stream) may be mapped to traffic stream AC 704. Because the traffic stream AC 704 does not include any type of data other than the parameterized traffic stream of the portion 704, such an AC may be referred to as a dedicated AC.

Figure 8:
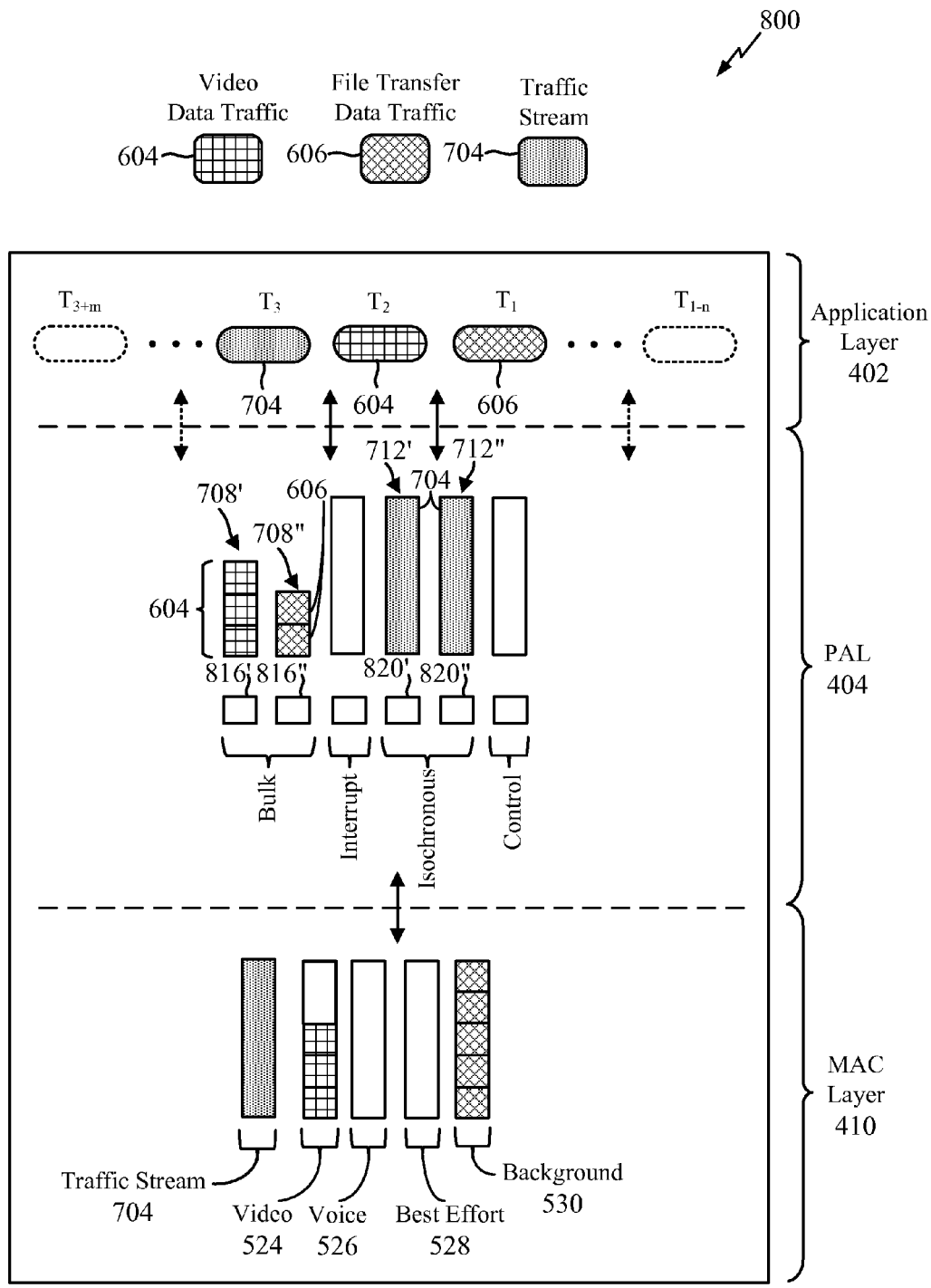
FIG. 8 is a diagram illustrating a third example of the flow of data traffic throughout the protocol layers illustrated in FIG. 5.

FIG. 8 is a diagram 800 illustrating a third example of the flow of data traffic throughout the protocol layers illustrated in FIG. 5. A description of various features illustrated in FIG. 8 is provided above with reference to FIG. 7 and, therefore, will not be repeated. In some configurations, each queue in the intermediate layer (e.g., PAL 404) is associated with a dedicated endpoint. An endpoint may be referred to as a dedicated endpoint when the endpoint is associated with no more than one queue. Because no more than one queue is associated with each endpoint, endpoints 816', 816", 820', 820" may each be referred to as a dedicated endpoint. For example, the bulk queue 708' is associated with the dedicated bulk endpoint 816', and the bulk queue 708" is associated with the dedicated bulk endpoint 816". As another example, the isochronous queue 712' is associated with the dedicated endpoint 820', and the isochronous queue 712" is associated with the dedicated endpoint 820".

In comparison to the example illustrated in FIG. 7, the example illustrated in FIG. 8 has no more than one endpoint for each queue. As such, the number of endpoints in the example illustrated in FIG. 8 is greater than the number of endpoints in the example illustrated in FIG. 7. When implemented in software, the examples illustrated in FIGS. 7 and 8 are expected to perform similarly. However, when implemented in hardware, the example illustrated in FIG. 8 may differ in performance relative to the performance of the example illustrated in FIG. 7. The example illustrated in FIG. 8 includes an increase in size and/or gate count of the endpoints relative to the size and/or gate count of the endpoints of the example illustrated in FIG. 7. Accordingly, when implemented in hardware, the examples illustrated in FIGS. 7 and 8 may differ in performance.

Figure 9:
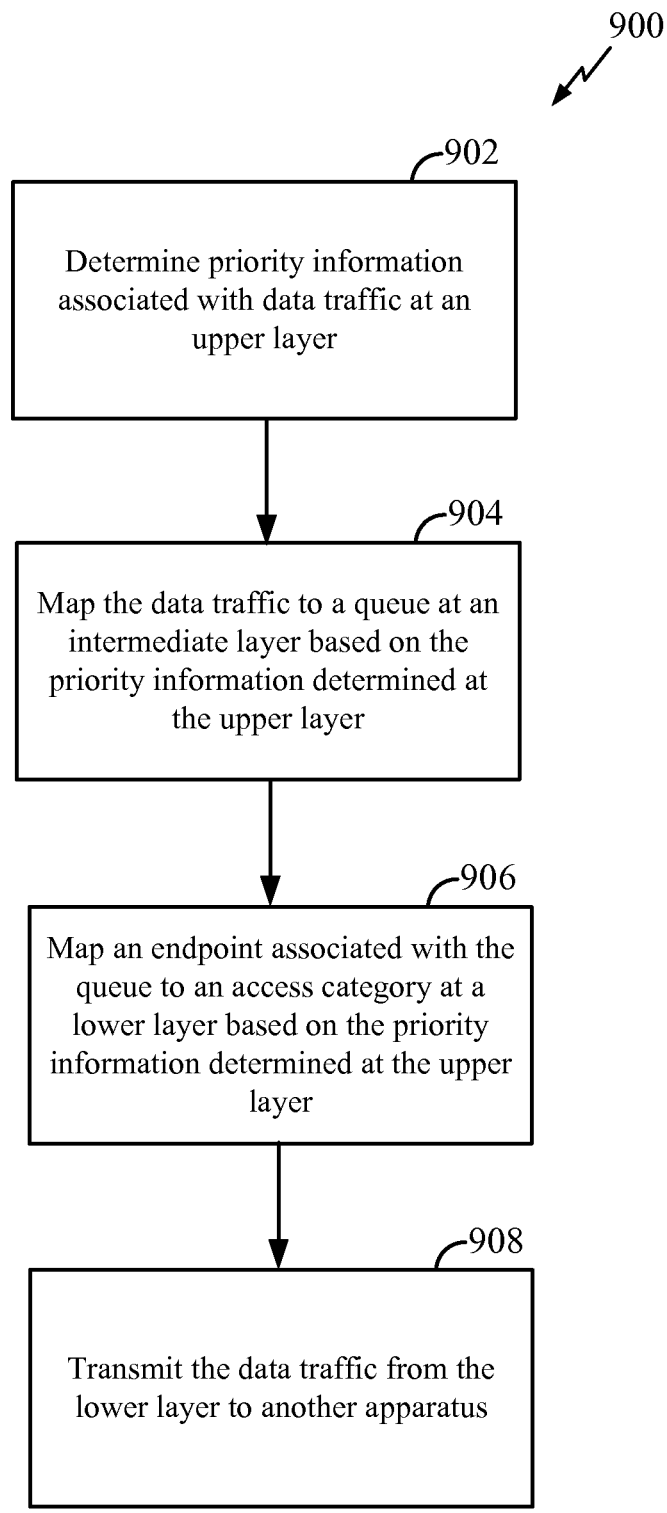
FIG. 9 is a diagram illustrating example methods and/or processes performed by various apparatuses.

FIG. 9 is a diagram 900 illustrating example methods and/or processes performed by an apparatus. For example, the apparatus may be any of the hosts described above (e.g., host 202). As another example, the apparatus may be any of the devices described above (e.g., device D1 204, device D2 208, device D3 210). As yet another example, the apparatus may be the apparatus 100 illustrated in FIG. 1.

At block 902, the apparatus may determine priority information associated with data traffic at an upper layer. For example, referring to FIG. 7, the apparatus may determine priority information (e.g., QoS information) associated with portion 606 and portion 604 of the data traffic at the application layer 402. In some configurations, the apparatus may determine that the video data traffic included in the portion 604 has a higher priority than the priority of the file transfer data traffic included in the portion 606.

At block 904, the apparatus may map the data traffic to a queue at an intermediate layer based on the priority information determined at the upper layer. For example, referring to FIG. 7, the apparatus may map the portion 606 of the data traffic to bulk queue 708' at the PAL 404 based on the priority information determined at the application layer 402. The apparatus may map the video data traffic to a queue that is different from the queue of the file transfer data traffic because the video data traffic has a higher priority than the priority of the file transfer data traffic.

At block 906, the apparatus may map an endpoint associated with the queue to an AC at a lower layer based on the priority information determined at the upper layer. For example, referring to FIG. 8, the apparatus may map the bulk endpoint 816' (which is associated with the bulk queue 708') to the background AC 530 based on the priority information of the video data traffic determined at the application layer 402. The apparatus may also map the bulk endpoint 816" (which is associated with the bulk queue 708") to the video AC 524 based on the priority information of the file transfer data traffic determined at the application layer 402. As described above, the priority of the video data traffic may be higher than the priority of the file transfer data traffic. By mapping the respective endpoints of these queues to different ACs based on the priority information, the apparatus enables the priority information of the data traffic to flow throughout the various protocol layers (e.g., application layer 402, PAL 404, MAC layer 410). Because the priority information flows throughout the various protocol layers, the flow of relatively higher priority data traffic (e.g., video data traffic) is not stopped (or delayed) because of congestion associated with lower priority data traffic (e.g., file transfer data traffic).

At block 908, the apparatus may transmit the data traffic from the lower layer to another apparatus. For example, referring to FIG. 1, the transceiver 110 of the apparatus 100 may transmit the data traffic from the lower layer to another apparatus. The transmission may be sent via any transmission medium, such as a wireless medium.

The methods and/or processes described with reference to FIG. 9 are provided for illustrative purposes and are not intended to limit the scope of the present disclosure. The methods and/or processes described with reference to FIG. 9 may be performed in sequences different from those illustrated therein without deviating from the scope of the present disclosure. Additionally, some or all of the methods and/or processes described with reference to FIG. 9 may be performed individually and/or together without deviating from the scope of the present disclosure. One of ordinary skill in the art understands that the specific order or hierarchy of steps in the methods disclosed is an illustration of various example processes. One of ordinary skill in the art further understands that the specific order or hierarchy of steps in the methods may be rearranged based upon various design preferences without deviating from the scope of the present disclosure. The accompanying method claims present elements of the various steps in a sample order and are not intended to be limited to the specific order or hierarchy described herein unless specifically recited in the claims.

An apparatus may include and/or provide the means for performing any one or more of the various functions described herein. Such an apparatus may be any of the hosts described above (e.g., host 202, host 304, etc.) and/or any of the devices described above (e.g., device D1 204, device D2 208, device D3 210, display device 306, etc.). Such an apparatus may, additionally or alternatively, be the apparatus 100 illustrated in FIG. 1. The apparatus 100 (e.g., specifically, the priority circuit 104' of the processor 104) may include and/or provide the means for determining a priority associated with data traffic at an upper layer (e.g., application layer 402). The apparatus 100 (e.g., specifically, the mapping circuit 104" of the processor 104) may further include and/or provide the means for mapping the data traffic to a queue at an intermediate layer (e.g., PAL 404) based on the priority determined at the upper layer (e.g., application layer 402). The apparatus 100 (e.g., specifically, the mapping circuit 104" of the processor 104) may further include and/or provide the means for mapping an endpoint associated with the queue to an AC at a lower layer (e.g., MAC layer 410) based on the priority determined at the upper layer (e.g., application layer 402).

As described in greater detail with reference to FIG. 1, the apparatus 100 may include one or more processors 104 configured for managing the bus 102 and general processing, including the execution of software stored on the computer-readable medium 106. The software, when executed by the one or more processors 104, causes the processing system 101 to perform the various functions described below for any one or more apparatuses. For example, the computer-readable medium 106 (e.g., specifically, the priority software 106') may include computer code for determining priority information associated with data traffic at an upper layer. As another example, the computer-readable medium 106 (e.g., specifically, the mapping software 106") may also include computer code for mapping the data traffic to a queue at an intermediate layer based on the priority information determined at the upper layer. As yet another example, the computer-readable medium 106 (e.g., specifically, the mapping software 106") may also include computer code for mapping an endpoint associated with the queue to an AC at a lower layer based on the priority information determined at the upper layer.

The description herein is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

The invention claimed is:

1. A method of wireless communication by an apparatus, the method comprising:
    at an upper layer, determining first priority information associated with a first portion of data traffic and second priority information associated with a second portion of data traffic;
    mapping the first portion of the data traffic to a first queue at an intermediate layer based on the first priority information determined at the upper layer;
    mapping the second portion of the data traffic to a second queue at the intermediate layer based on the second priority information determined at the upper layer, wherein the first queue is different from the second queue;
    mapping an endpoint associated with the first or second queues to an access category (AC) at a lower layer based on the first or second priority information determined at the upper layer; and
    transmitting the first or second portions of the data traffic from the lower layer to another apparatus.

2. The method of claim 1, wherein:
    the upper layer is an application layer;
    the intermediate layer is a protocol adaptation layer (PAL); and
    the lower layer is a media access control (MAC) layer.

3. The method of claim 1, wherein two or more queues are associated with a single endpoint.

4. The method of claim 1, wherein each queue is associated with a dedicated endpoint.

5. The method of claim 1, wherein the AC comprises voice AC, a video AC, a best effort AC, or a background AC.

6. The method of claim 1, wherein the endpoint comprises a bulk endpoint, an interrupt endpoint, a control endpoint, or an isochronous endpoint.

7. The method of claim 1, wherein the first or second priority information is further associated with a classification or type of data in the data traffic.

8. The method of claim 1, wherein:
    the first or second portions of the data traffic comprise a parameterized traffic stream;
    the mapping the first or second portions of data traffic comprises mapping the parameterized traffic stream to a dedicated queue at the intermediate layer; and
    the mapping the endpoint comprises mapping the parameterized traffic stream to a dedicated AC.

9. The method of claim 1, wherein:
    a first endpoint associated with the first queue at the intermediate layer is mapped to a first AC at the lower layer based on the first priority information;

a second endpoint associated with the second queue at the intermediate layer is mapped to a second AC at the lower layer based on the second priority information; and the first AC is different from the second AC.

10. An apparatus for wireless communication, the apparatus comprising:
a memory;
at least one processor coupled to the memory and configured to:
 at an upper layer, determine first priority information associated with a first portion of data traffic and second priority information associated with a second portion of data traffic;
 map the first portion of the data traffic to a first queue at an intermediate layer based on the first priority information determined at the upper layer;
 map the second portion of the data traffic to a second queue at the intermediate layer based on the second priority information determined at the upper layer, wherein the first queue is different from the second queue; and
 map an endpoint associated with the first or second queues to an access category (AC) at a lower layer based on the first or second priority information determined at the upper layer; and
a transceiver configured to:
 transmit the first or second portions of the data traffic from the lower layer to another apparatus.

11. The apparatus of claim 10, wherein:
the upper layer is an application layer;
the intermediate layer is a protocol adaptation layer (PAL); and
the lower layer is a media access control (MAC) layer.

12. The apparatus of claim 10, wherein two or more queues are associated with a single endpoint.

13. The apparatus of claim 10, wherein each queue is associated with a dedicated endpoint.

14. The apparatus of claim 10, wherein the AC comprises a voice AC, a video AC, a best effort AC, or a background AC.

15. The apparatus of claim 10, wherein the endpoint comprises bulk endpoint, an interrupt endpoint, a control endpoint, or an isochronous endpoint.

16. The apparatus of claim 10, wherein the first or second priority information is further associated with a classification or type of data in the data traffic.

17. The apparatus of claim 10, wherein:
the first or second portions of the data traffic comprise a parameterized traffic stream;
the mapping the first or second portions of data traffic comprises mapping the parameterized traffic stream to a dedicated queue at the intermediate layer; and
the mapping the endpoint comprises mapping the parameterized traffic stream to a dedicated AC.

18. The apparatus of claim 10, wherein:
a first endpoint associated with the first queue at the intermediate layer is mapped to a first AC at the lower layer based on the first priority information;
a second endpoint associated with the second queue at the intermediate layer is mapped to a second AC at the lower layer based on the second priority information; and
the first AC is different from the second AC.

19. A non-transitory computer-readable medium storing computer-executable code configured for:

at an upper layer, determining first priority information associated with a first portion of data traffic and second priority information associated with a second portion of data traffic;
mapping the first portion of the data traffic to a first queue at an intermediate layer based on the first priority information determined at the upper layer;
mapping the second portion of the data traffic to a second queue at the intermediate layer based on the second priority information determined at the upper layer, wherein the first queue is different from the second queue; and
mapping an endpoint associated with the first or second queues to an access category (AC) at a lower layer based on the first or second priority information determined at the upper layer.

20. The non-transitory computer-readable medium of claim 19, wherein:
the upper layer is an application layer;
the intermediate layer is a protocol adaptation layer (PAL); and
the lower layer is a media access control (MAC) layer.

21. The non-transitory computer-readable medium of claim 19, wherein:
the AC comprises a voice AC, a video AC, a best effort AC, or a background AC; and
the endpoint comprises a bulk endpoint, an interrupt endpoint, a control endpoint, or an isochronous endpoint.

22. The non-transitory computer-readable medium of claim 19, wherein the first or second priority information is further associated with a classification or type of data in the data traffic.

23. The non-transitory computer-readable medium of claim 19, wherein:
the first or second portions of the data traffic comprise a parameterized traffic stream;
the mapping the first or second portions of data traffic comprises mapping the parameterized traffic stream to a dedicated queue at the intermediate layer; and
the mapping the endpoint comprises mapping the parameterized traffic stream to a dedicated AC.

24. An apparatus for wireless communication, the apparatus comprising:
means for determining, at an upper layer, first priority information associated with a first portion of data traffic and second priority information associated with a second portion of data traffic;
means for mapping the first portion of the data traffic to a first queue at an intermediate layer based on the first priority information determined at the upper layer;
means for mapping the second portion of the data traffic to a second queue at the intermediate layer based on the second priority information determined at the upper layer, wherein the first queue is different from the second queue; and
means for mapping an endpoint associated with the first or second queues to an access category (AC) at a lower layer based on the first or second priority information determined at the upper layer.

25. The apparatus of claim 24, wherein:
the upper layer is an application layer;
the intermediate layer is a protocol adaptation layer (PAL); and
the lower layer is a media access control (MAC) layer.

26. The apparatus of claim 24, wherein:
the AC comprises a voice AC, a video AC, a best effort AC, or a background AC; and
the endpoint comprises a bulk endpoint, an interrupt endpoint, a control endpoint, or an isochronous endpoint.

27. The apparatus of claim 24, wherein the first or second priority information is further associated with a classification or type of data in the data traffic.

28. The apparatus of claim 24, wherein:
the first or second portions of the data traffic comprise a parameterized traffic stream;
the means for mapping the data traffic is configured for mapping the parameterized traffic stream to a dedicated queue at the intermediate layer; and
the means for mapping the endpoint comprises mapping the parameterized traffic stream to a dedicated AC.

* * * * *